United States Patent

[11] 3,632,069

[72] Inventors Arlie J. Thayer
 Tinley Park;
 Douglas H. Cameron, New Lenox, both of Ill.
[21] Appl. No. 10,530
[22] Filed Feb. 11, 1970
[45] Patented Jan. 4, 1972
[73] Assignee Panduit Corp.
 Tinley Park, Ill.

[54] BRACKET FOR MOUNTING CABLE BUNDLES IN LIGHTENING HOLES
 7 Claims, 15 Drawing Figs.
[52] U.S. Cl. .................................................. 248/56, 248/68, 248/74 PB
[51] Int. Cl. ................................................... F16l 5/00
[50] Field of Search ........................................ 248/74, 74 PB, 56, 68; 174/40 CC

[56] References Cited
 UNITED STATES PATENTS
 2,915,268 12/1959 Wrobel .......................... 248/74
 2,964,274 12/1960 Richardson .................. 248/68
 3,454,247 7/1969 Geisinger ..................... 248/74 X
 3,454,249 7/1969 Geisinger ..................... 248/74 X
 FOREIGN PATENTS
 695,251 9/1964 Canada ......................... 248/74
 933,929 8/1963 Great Britain ................ 248/68

Primary Examiner—Chancellor E. Harris
Attorney—Prangley, Clayton, Mullin, Dithmar & Vogel ABSTRACT: A bracket for mounting wire bundles or the like to be held by binder ties and for retaining the binder ties adjacent flanged lightening holes in bulkheads and including a single mounting leg having an attachment portion for attachment to either side of the bulkhead adjacent to the hole by a single fastener, an inclined portion which lies generally along and below the flange, and a platform connected to the inclined portion and disposed in use in the hole axially over a flange thereof and having a surrounded passage therethrough for retaining and orienting the binder tie adjacent the general plane of the hole; three embodiments of the platform are disclosed.

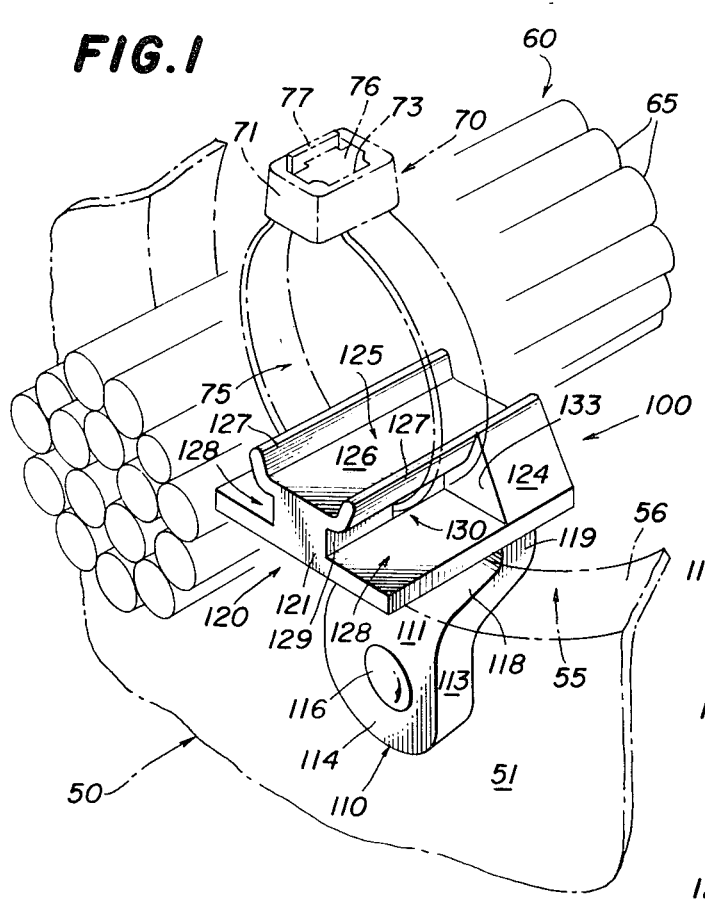

BRACKET FOR MOUNTING CABLE BUNDLES IN LIGHTENING HOLES

This invention relates to means for mounting and retaining bundles of wires or the like and, in particular, a mounting bracket for mounting and retaining a bundle through a lightening hole in a bulkhead, panel or the like.

It is an important object of this invention to provide a bracket for mounting and retaining a bundle of wires or the like through a lightening hole in a bulkhead, the bracket comprising a mounting leg for attachment to the bulkhead adjacent to the lightening hole therein, a platform connected to the leg and extending into the associated lightening hole for supporting an associated bundle thereon, the platform having a passage therein for accommodating an associated binder tie therethrough, the passage serving to position the associated binder tie in the lightening hole with the axis or main line of direction of the binder tie disposed generally in a plane substantially parallel to the plane of the lightening hole, whereby a binder tie disposed in the passage and secured around an associated bundle serve to securely position the bundle on the bracket in the lightening hole for effectively retaining the bundle out of contact with the edge of the lightening hole.

It is another object of this invention to provide a bracket of the type set forth wherein the mounting leg is attached to the bulkhead by means of a single fastener, the platform being so dimensioned and positioned in use that the opposite sides thereof are respectively disposed radially adjacent the edge of the lightening hole for providing a second and third support for limiting pivotal movement of the platform about the longitudinal axis of the associated fastener.

Another object of this invention is to provide a bracket of the type set forth for use with a bulkhead which has a flange thereon extending around the periphery of the lightening hole and disposed at a predetermined angle with respect to the bulkhead, wherein the leg has a mounting portion adjacent one end thereof for attachment to either side of the bulkhead and an inclined portion at the other end thereof, the inclined portion being disposed at an angle with respect to the mounting portion for accommodating flanges of varying shapes and angles.

In connection with the foregoing objects, it is yet another object of this invention to provide a bracket of the type set forth having all of the characteristics and features described in the foregoing objects.

Further features of the invention pertain to the particular arrangement of the parts of the mounting bracket whereby the above-outlined and additional operating features are attained.

The invention, both as to its organization and method of operation, together with further objects and advantages thereof will best be understood with reference to the following specification taken in conjunction with the accompanying drawings, in which:

FIG. 1 is a front perspective view of a mounting bracket according to a first embodiment of the invention with the bracket attached in its use position on one side of an associated bulkhead adjacent to a flanged lightening hole therein and illustrating the method of attaching an associated bundle thereto;

FIG. 2 is a reduced side elevational view of the bracket of FIG. 1 showing the structure thereof which facilitates accommodation of a flange of a lightening hole extending in either axial direction from the hole;

FIG. 3 is a front elevational view of the bracket as shown in FIG. 2;

FIG. 4 is a fragmentary view in vertical section taken along the line 4—4 in FIG. 2;

FIG. 5 is a view in horizontal section taken along the line 5—5 in FIG. 3;

FIG. 6 is a front elevational view of a bracket showing an alternative embodiment of the attachment leg for attachment by means of adhesives;

Figure 7:
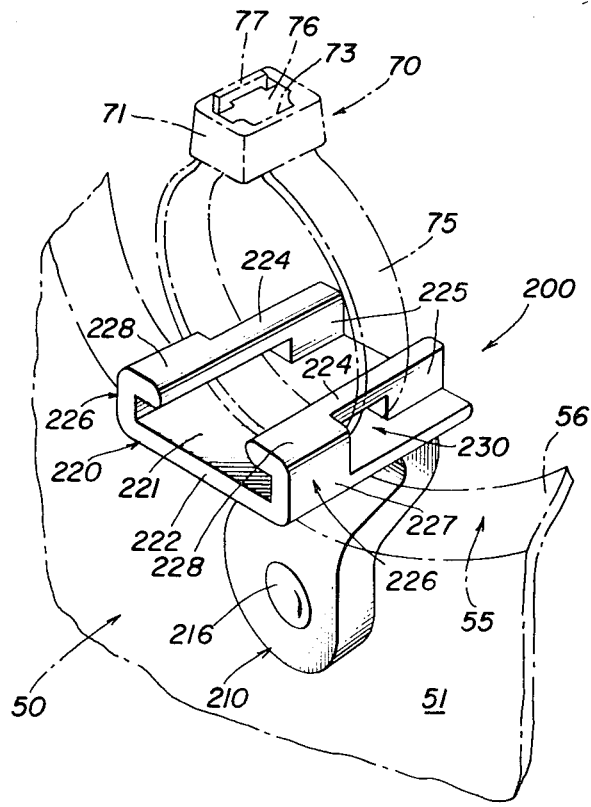
FIG. 7 is a front perspective view similar to FIG. 1 of a second embodiment of the bracket of this invention.

Referring now to FIGS. 1 through 5 of the drawings, there is shown a bracket, generally designated by the numeral 100, illustrated for use in mounting a bundle 60 held by a binder tie 70, and for retaining the binder tie 70 adjacent a lightening hole through a bulkhead 50. The bulkhead 50 is generally vertically disposed and has a front surface 51, a rear surface 52 and a generally circular lightening hole 55 extending therethrough. The bulkhead 50 may be provided with a stiffening flange 56 extending around the periphery of the lightening hole 55 and disposed toward one side of the bulkhead 50 at a predetermined angle thereto. In FIG. 2, the flange 56 is shown extending toward the side 52, or alternately toward the side 51 of the bulkhead 50, forming an obtuse angle therewith.

A generally cylindrical bundle 60 of wires 65 or the like passes through the lightening hole 55 in the bulkhead 50. The bundle 60 is held by a binder tie generally designated by the numeral 70. The binder tie 70 may be of the type disclosed in U.S. Pat. No. 3,197,829, issued to J. E. Caveney et al. on Aug. 3, 1965, and assigned to the assignee of this invention, the disclosure of which patent is incorporated herein by reference. Preferably, the binder tie 70 includes a head 71 having an opening 73 extending therethrough and a strap 75 having a head end 76 and tongue end 77. The strap 75 is extended around the associated bundle 60 and the tongue 77 is then extended through the opening 73 in the head 71 at which point teeth (not shown) on the strap 75 engage with complementary teeth (not shown) on the head end 76 thereof for firmly locking the binder tie 70 in position about the bundle 60.

The bracket 100 has been provided for mounting the bundle 60 in the lightening hole 55. The bracket 100 is preferably of single-piece molded construction and includes a mounting leg, generally designated by the numeral 110, which is integral at one end thereof with a platform, generally designated by the numeral 120. The mounting leg 110 is generally S-shaped or serpentine and is generally rectangular in transverse cross section. The mounting leg 110 has a front surface 111, a rear surface 112 and a peripheral or side surface 113 interconnecting the surfaces 111 or 112 along the peripheries thereof.

The leg 110 also includes an attachment portion 114 at one end thereof disposed in use generally parallel to the adjacent surface of the bulkhead 50 and having a single opening 115 extending therethrough for receiving therein an associated fastener 116 such as a screw or rivet for attachment of the mounting leg 110 to the associated bulkhead 50. Integral with the upper end of the attachment portion 114 is a support portion 118 which extends from the attachment portion 114 at an angle sufficient to accommodate the flange 56 of the bulkhead 50, the purpose of which will be described more fully hereinafter. At the upper end of the support portion 118 is a short spur or stub portion 119 extending upwardly substantially parallel to the attachment portion 114.

Integral with the upper end of the stub portion 119 is the platform 120. The platform 120 is generally rectangular in shape, having a front end 121, a rear end 122 and a pair of inwardly and upwardly sloping sides 123 and 124, the stub portion 119 being connected to the platform 120 at the rear end 122 thereof. The top surface of the platform 120 is recessed to form a channel or trough 125 extending from the front to the rear thereof, the channel 125 having a flat bottom support surface 126 and a pair of upwardly and outwardly sloping flanges 127 along the opposite side edges thereof. The forward portions of the sides 123 and 124 of the platform 120 are each cut away or recessed beneath the flanges 127 to form a pair of notches 128, the notches 128 each extending inwardly from the adjacent side of the platform 120 an equal distance and respectively terminating in an inner sidewall 129.

The sidewalls 129 are substantially parallel to each other and to the adjacent side edges of the platform 120 and cooperate to define therebetween a front post 135 supporting the front end of the channel 125. The rear ends of the notches 128 respectively terminate in flat end walls 133 disposed substantially normal to the inner sidewalls 129. Extending transversely through the post 135 from one sidewall 129 to the other sidewall 129 thereof substantially normal thereto and beneath the channel 125 adjacent to the end walls 133 is an opening or slot, generally designated by the numeral 130, the slot 130 having transverse dimensions slightly greater than the transverse cross-sectional dimensions of an associated strap 75.

A second opening 131, extending inwardly from the rear end 122 of the platform 120 and generally centrally thereof beneath the trough or channel 125 may be provided. Opening 131 is in communication with the slot 130 and the longitudinal axis of the opening 131 is preferably substantially normal to the longitudinal axis of the slot 130. The openings 130 and 131 cooperate to define a pair of rear posts 132 for supporting the opposite sides of the channel 125 at the rear end thereof. The dimensions of the notches 128 and the slot 130 are such that the slot 130 is disposed substantially midway between the front end 121 and rear end 122 of the platform 120.

In operation, the bracket 100 is mounted on one side of an associated bulkhead 50 adjacent to the lower end of the lightening hole 55 therethrough as illustrated in FIGS. 1 and 2. It is a significant feature of the present invention that the unique shape of the mounting leg 110 permits use of the bracket 100 with a lightening hole having a flange 56 extending therearound, and, in particular, permits attachment of the bracket 100 to either side of the bulkhead 50 adjacent to the flanged lightening hole 55 with the same surface 111 in engagement with bulkhead 50.

Referring, for example, to FIG. 1 of the drawings, there is shown a mounting bracket 100 attached to the side 52 of the bulkhead 50.

For mounting in this position, the attachment leg 110 is disposed with the front surface 111 thereof in contact with the surface 52 of the bulkhead 50 with the support portion 118 underlying the lower edge of the flange 56, preferably with the upper surface of the support portion 118 adjacent the under surface of the flange 56. After being disposed in this position, the mounting leg 110 is secured to the surface 52 of the bulkhead 50 by means of an appropriate fastener 116 passed through the opening 115 of the attachment portion 114. The fastener 116 may be any of several common types, such as screws or rivets.

In FIG. 2 there is illustrated the method of attaching the bracket 100 to a bulkhead 50, having a flange 56 which may extend in either direction relative to surface 52. In either case, the same surface 111 of the attachment portion 114 is placed against surface 52 of the bulkhead 50.

In use, the platform 120 extends forwardly of the stub portion 119 and into the lightening hole 55, with the slot 130 being so disposed that the plane of the bulkhead 50 and the lightening hole 55 passes substantially vertically therethrough. Furthermore, the longitudinal axis of the slot 130 is substantially parallel to the plane of the hole 55, while the channel 125 of the platform 120 extends substantially axially of the hole 55. The platform 120 is preferably dimensioned so that, when attached in the mounting position thereof, the bottom edges of the sides 123 and 124 are disposed adjacent or in contact with the edge of the flange 56 irrespective of which side of the bulkhead the mount 100 is secured to (FIGS. 2 and 3) for a purpose to be described more fully hereinafter.

When the bracket 100 is securely fastened in the mounting position thereof as illustrated in FIGS. 1-3, an associated bundle 60 is passed through the lightening hole 55 and disposed upon the bracket 100 in the channel 125 thereof. The head 71 of an associated binder tie 70 is positioned atop the bundle 60 in the hole 55. Then the tongue 77 of the strap 75 is extended downwardly around one side of the bundle 60, through the slot 130 in the platform 120, then upwardly around the other side of the bundle 60 and through the opening 73 in the head 71 for engagement with the head end 76 of the strap 75 in the usual manner. It will be noted that the slot 130 is completely surrounded at the opposite ends thereof by the flanges 127 and the portions of the platform 120 forming the notches 128 to form a passage through the platform 120. Thus, when the binder tie 70 is tightened about the bundle 60, the strap 75 will be oriented by the passage 130 substantially in the plane of the lightening hole 55 and will be retained by the passage 130 in that orientation, the strap 75 being effectively trapped in the passage 130 so as to prevent removal of the binder tie 70 from the bracket 100 once the binder tie has been secured about the bundle 60. Further, it will be noted that the outer surfaces of the sloping flanges 127 and the bottoms of the notches 128 serve as strap guides for the binder tie 70 to facilitate the insertion of the strap 75 into the passage 130.

When the binder tie 70 is tightened about the bundle 60, the bundle is constricted to a tight cylindrical form out of contact with the edges of the lightening hole 55. It will be apparent that, when the bundle 60 is secured to the bracket 100 as illustrated in FIGS. 1 and 2, the point of support for the bundle 60 is in the lightening hole 55. This is significant in mounting the bundle 60 out of contact with the edges of the lightening hole 55, since when the bundle is supported at this optimum point in the hole 55 any lateral movements of the bundle 60 at points outside the lightening hole 55 will have minimal effect on the portion of the bundle within the hole 55.

Furthermore, it is another significant feature of this invention that, by reason of the single mounting leg 110, the bracket 100 may be moved in a direction axially of the lightening hole 55 to the mounting position on either side of the bulkhead 50. The entire bracket 100 does not have to be placed in the hole 55 and then moved radially to the mounting position on the bulkhead, whereby the bracket 100 may be used with relatively small lightening holes 55. Furthermore, since only a single fastener 116 is used, pivotal movements of the bracket 100 about the longitudinal axis of the fastener 116 might be possible. HOwever, to limit such pivotal movements, the platform 120 is so dimensioned that the bottom side edges thereof are substantially in contact with the adjacent portions of the flange 56 so that any tendency toward pivotal movement will be limited by engagement of the flange 56 with the platform 120 as can best be seen in FIG. 3, thus, further to insure that the bundle 60 will remain out of contact with edges of the lightening hole 55.

In FIG. 6 there is shown an alternative embodiment 100A of the mounting leg 110. In this embodiment, the attachment portion 114A is generally rectangular and has a lateral extent substantially greater than the lateral extent of the support portion 118A. In this embodiment, instead of utilizing a fastener 116, the attachment portion 114A may be provided with a suitable adhesive such as epoxy cement or the like on the surface 111A thereof for securing the bracket 100 to surface 52 of the associated bulkhead 50.

Figure 8:
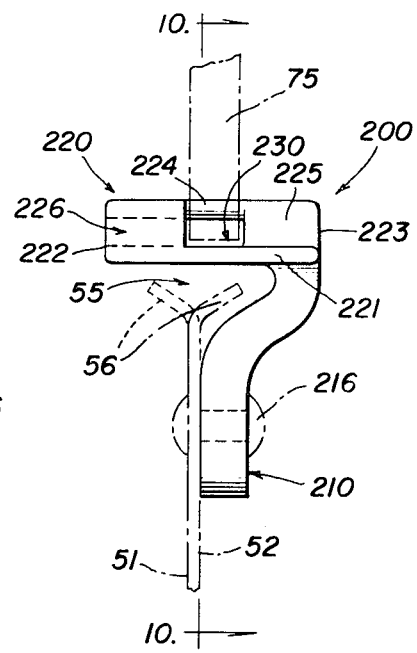
FIG. 8 is a reduced side elevational view of the bracket of FIG. 7, showing the structure thereof which facilitates accommodation of a flange of a lightening hole extending either direction from the hole.
Figure 9:
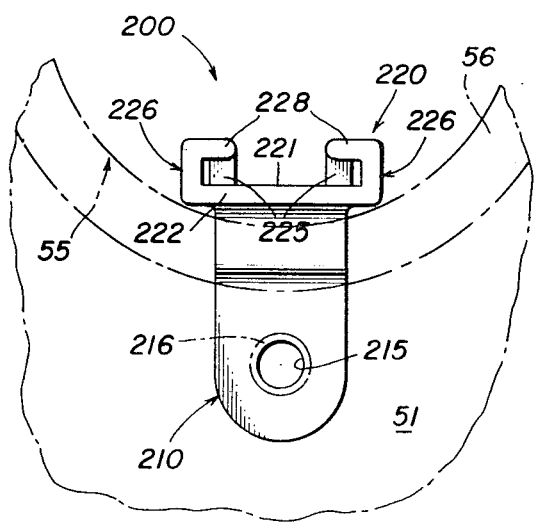
FIG. 9 is a front elevational view of the bracket as shown in FIG. 8.
Figure 10:
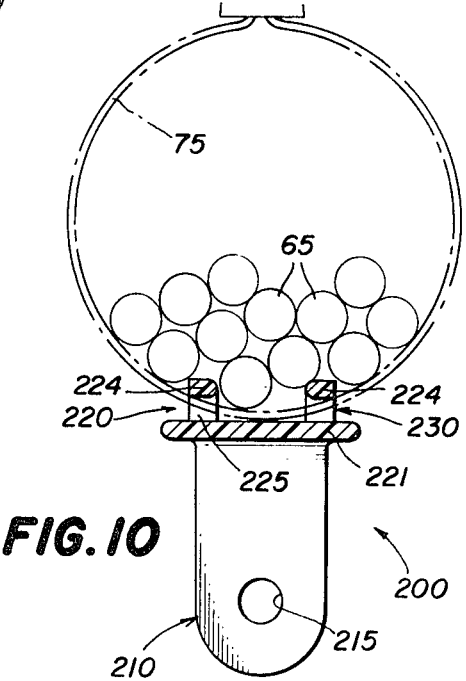
FIG. 10 is a view in vertical section taken along the line 10—10 in FIG. 8 and showing a portion of an associated bundle with a binder tie strap secured therearound.

Referring now to FIGS. 7-10 of the drawings, there is shown a second embodiment 200 of the bracket of this invention including a mounting leg 210 and a platform 220. The mounting leg 210 is preferably provided with an opening 215 therethrough for receiving a suitable fastener 216 for attaching the bracket 200 to an associated bulkhead 50 as illustrated in FIGS. 7 to 9. The mounting leg 210 is identical to the mounting leg 110 in the first embodiment of the invention and will, therefore, not be described in detail. Similarly, the method of attachment of the mounting leg 210 to either side of the bulkhead 50 is identical to the method of attachment of the leg 110 and will not be described in detail.

Integral with the upper end of the mounting leg 210 is a platform 220 having a flat rectangular base 221 with a front end 222 and a rear end 223 connected to the mounting leg 210. Disposed above the upper surface of the base 221 substantially parallel thereto are a pair of spaced-apart parallel bars or guide members 224, the bars 224 being respectively disposed a short distance inwardly from the adjacent side edges of the platform 220 and substantially parallel thereto. Each of the bars 224 is supported at the rear end thereof by a mounting post 225 extending upwardly from the rear end of the base 221.

The front ends of each of the bars 224 are respectively supported by a pair of front angle posts 226, each of the posts 226 having an upper flange 228 integral with the front end of the associated bar 224 and substantially parallel to the base 221 and a lower flange 227 integral with the flange 228 at the outer side thereof and extending vertically downwardly therefrom to the adjacent front side edge of the base 221. Each of the bars 224 respectively cooperates with the base 221 to define therebetween an opening or slot 230 extending from the front of the associated post 225 to the rear of the associated post 226, the shape and dimensions of each of the slots 230 being slightly greater than the dimensions of an associated binder tie strap 75. The slots 230 are disposed in lateral horizontal alignment with each other and cooperate to define a passage through the platform 220 with the longitudinal axis of the passage substantially normal to the side edges of the platform 220.

In use, the platform 220 extends forwardly of the mounting leg 210 into the lightening hole 55 with the passage defined by the slots 230 so positioned that the plane of the lightening hole 55 passes substantially therethrough, the longitudinal axis of the passage being substantially parallel to the plane of the lightening hole 55. A bundle 60 (not shown) is passed through the lightening hole 55 and disposed upon the platform 220 of the bracket 200. In this position the head 71 of a binder tie 70 is disposed atop the bundle 60 in the lightening hole 55 with the head end 76 of the strap 75 securely lodged in the opening 73. Then the tongue 77 of the strap 75 is extended downwardly around one side of the bundle 60, passed through the adjacent slot 230 beneath the bundle 60, outwardly through the other slot 230, upwardly around the other side of the bundle 60 and then through the opening 73 in the head 71 for engagement with the head end 75 in the usual manner.

It will be noted that each of the slots 230 is surrounded by the base 221 and by the associated bar 224 and posts 225 and 226. Thus, the passage defined by the slots 230 serves to orient the binder tie 70 so that the plane of the lightening hole 55 passes substantially therethrough with the axis or main line of directions of the strap 75 being generally in a plane substantially parallel to the plane of the lightening hole 55. Thus, the support point for the bundle 60 is in the hole 55 with the attendant advantages described above in connection with the embodiment of FIG. 1. Furthermore, the surrounded slots 230 serve to effectively trap the associated binder tie strap 75 therein to prevent removal of the binder tie 70 from the bracket 200 once the binder tie 70 has been secured around the associated bundle.

Referring now to FIGS. 11 through 15 of the drawings, there is shown a third embodiment 300 of the bracket of this invention the bracket 300 including a mounting leg 310 integral with a platform 320. The mounting leg 210 is preferably provided with an opening 315 therethrough to accommodate an associated fastener 316 for attachment of the bracket 300 to the bulkhead 50. The construction and method of mounting of the mounting leg 310 are identical to the construction and method of mounting of the leg 110 in the first embodiment of the invention, whereby these features will not be here repeated.

Integral with the upper end of the mounting leg 310 is a generally rectangular platform 320 having a flat horizontally disposed base 321 having a front end 322, a rear end 322A connected to the leg 310 and a flat planar upper surface 323. Disposed above the upper surface 323 of the base 321 is an arcuate saddle 325 having a concave part-cylindrical upper surface 326 forming a shallow channel extending longitudinally from the rear end of the platform 320 to a point intermediate the front and rear ends thereof and a lower surface 327 generally concentric with the upper surface 326 and integral at the bottom rear portion thereof with the upper end of the mounting leg 310. Extending forwardly from the side edges of the saddle 325 above and substantially parallel to the opposite side edges of the base 321 are a pair of generally cylindrical arms 324 integral at the front ends thereof with a pair of posts 328 respectively connected to the front corners of the base 321 for supporting the arms 324 thereon. Each of the arms 324 cooperates with the base 321 to define therebetween a slot or opening 330 extending laterally from the front surface 329 of the saddle 325 to the rear end of the adjacent post 328 and having transverse dimensions slightly greater than the transverse cross-sectional dimensions of an associated binder tie strap 75. The slots 330 are disposed in lateral horizontal alignment with each other and cooperate to define a passage extending through the platform 320 having a longitudinal axis substantially normal to the opposite side edges of the platform 320. *In use, the platform 320 extends forwardly of the mounting leg 310 into the lightening hole 55 in bulkhead 50 with the passage defined by the slots 330 so positioned that the plane of the lightening hole 55 passes substantially therethrough, the longitudinal axis of the passage formed by the slots 330 being substantially parallel to the plane of the lightening hole 55. An associated bundle 60 (not shown) is disposed axially through the lightening hole 55 and is placed upon the upper surface 326 of the saddle 325. With the bundle in this position, the head 71 of an associated binder tie 70 is placed atop the bundle 60 in the lightening hole 55 with the head end 76 of the strap 75 securely lodged therein. The tongue 77 of the strap 75 is then extended downwardly around one side of he bundle 60, through one of the slots 330, beneath the bundle 60, outwardly through the other slot 330, upwardly around the opposite side of the bundle 60 and then into the opening 73 in the head 71 for engagement with the head end 76 of the strap 75 in the usual manner. It will be noted that each of the slots 330 is surrounded by the base 321 and front wall 329 of the saddle 325 and by the adjacent arm 325 and post 328. Thus, when the binder tie 70 is tightened about the bundle 50, the strap 75 will be oriented by the slots 330 so the plane of the lightening hole 55 passes therethrough with the axis or main line of direction of the strap 75 generally in a plane substantially parallel to the plane of the lightening hole 55. Also, the strap 75 will be effectively trapped by the slots 330 so that once the binder tie has been secured about the associated bundle it may not be separated from the bracket 330. Accordingly, it will be noted that the support point for the bundle 60 lies in the lightening hole 55 with the attendant advantages discussed above with respect to the embodiment of FIG. 1. Further, it will be noted that the cylindrical outer surfaces of the arms 324 and the upper surface 323 of he base 321 cooperate to act as guide surfaces to facilitate the threading of the strap 75 through the passage formed by the slots 330.*

Figure 11:
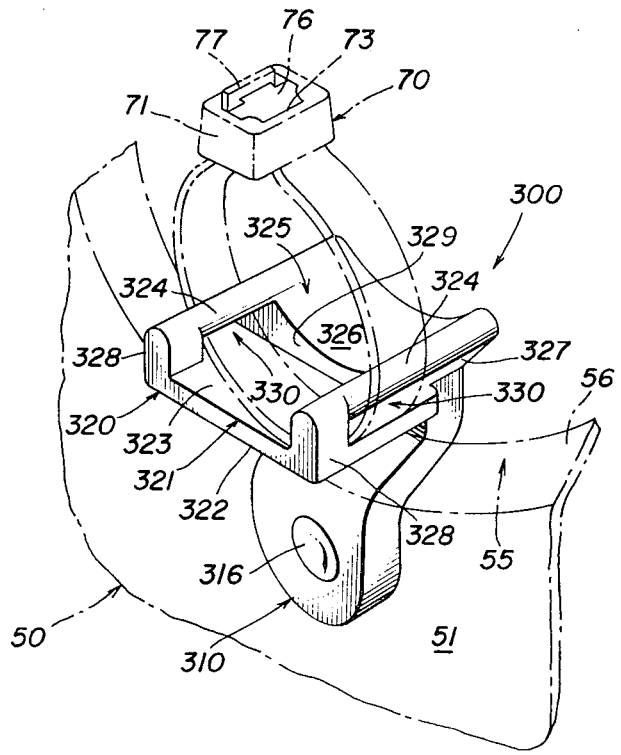
FIG. 11 is a front perspective view similar to FIGS. 1 and 7 of a third embodiment of the bracket of this invention.
Figure 12:
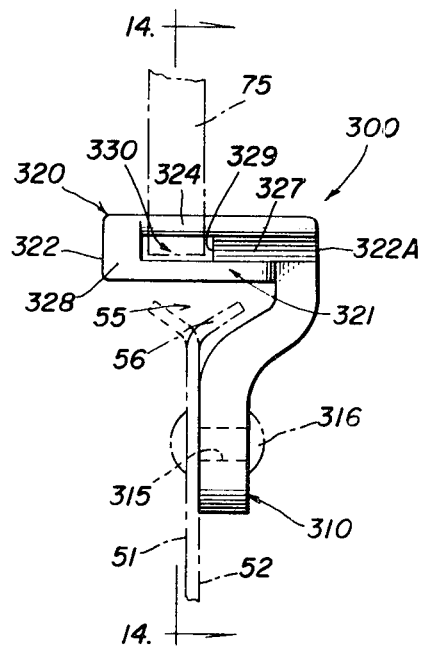
FIG. 12 is a reduced side elevational view of the bracket of FIG. 11, showing the structure thereof which facilitates accommodation of a flange of a lightening hole extending in either axial direction from the hole.
Figure 13:
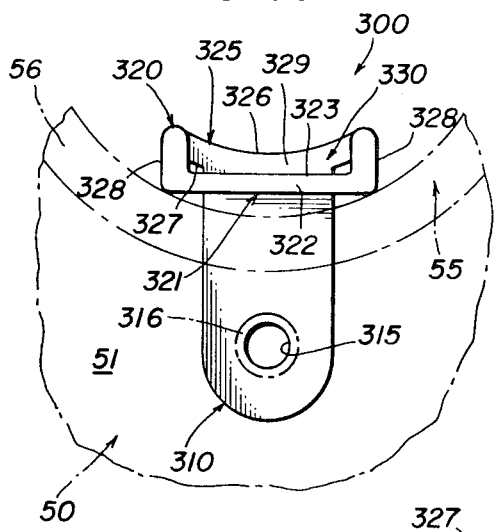
FIG. 13 is a front elevational view of the bracket of FIG. 12.
Figure 14:
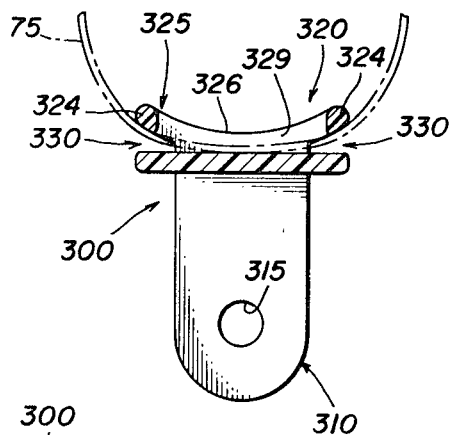
FIG. 14 is a view in vertical section taken along the line 14—14 in FIG. 12.
Figure 15:
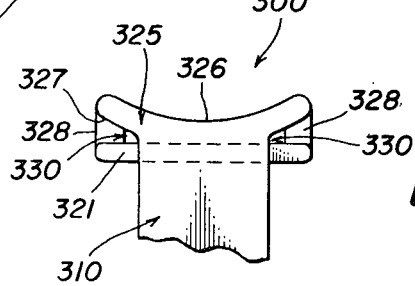
FIG. 15 is a fragmentary rear elevational view of the bracket of FIG. 14.

While the mounting legs 210 and 310 of the embodiments of FIGS. 7 and 11 of the invention have been shown with holes for accommodating suitable fasteners therethrough, it will, of course, be understood that both of these embodiments may also be provided with an adhesive-backed mounting leg of the type illustrated in FIG. 6. In addition, while the bracket of this invention has been disclosed in association with a flanged lightening hole, it will be understood that the bracket may also be used with unflanged lightening holes or with panels or the like not having lightening holes. Each of the embodiments of FIGS. 1, 7 and 11 is preferably of a single-piece molded construction and may be formed of any suitable material such as nylon.

It is an important advantage of the single-leg construction of this invention that the mounting leg thereof may be secured to the associated bulkhead by means of a rivet inasmuch as the head of the rivet can be formed directly against the metal of the bulkhead rather than against plastic or nylon as would be the case if the bracket employed a pair of legs straddling the bulkhead.

From the foregoing, it will be seen that there has been provided hereby an improved bracket for mounting a bundle through a lightening hole on a bulkhead. In particular, there has been provided a bracket having a single mounting leg and a platform proportioned to facilitate attachment of the bracket to either side of a bulkhead adjacent to the lightening hole therein, whether or not the lightening hole has a stiffening flange therearound.

In addition, there has been provided hereby an improved bracket of simple and economical construction which may be moved axially to a mounting position on either side of a bulkhead for attachment thereto by means of a single fastener, pivotal movement about the axis of the fastener being prevented by engagement of the sides of the bracket platform with the edges of the lightening hole.

Furthermore, there has been provided hereby a bracket for mounting a bundle through a lightening hole in a bulkhead with the support point for the bundle being near the plane of the lightening hole to minimize movement of the bundle within the hole thereby to insure that the bundle is retained out of contact with the edges of the lightening hole.

There has been further provided hereby a bracket which may be mounted on an associated bulkhead by means of either suitable fasteners or an adhesive material, the bracket being provided with any one of three different embodiments of a bundle-mounting platform.

Also, it should be noted that the bracket of this invention can be applied to a hole with or without a flange and further, could be applied adjacent to the edge of a solid member.

While there have been described what are at presently considered to be the preferred embodiments of the invention, it will be understood that various modifications may be made therein and it is intended to cover in the appended claims all such modifications as fall within the true spirit and scope of the invention.

What is claimed is:

1. A bracket for mounting and retaining wire bundles or the like through a lightening hole in a bulkhead by retaining a binder tie secured around the bundle wherein the bulkhead has a flange thereon extending around the periphery of the lightening hole and disposed at a predetermined angle with respect to the bulkhead, said bracket comprising a single leg having a mounting portion adjacent to one end thereof for attachment to either side of the associated bulkhead adjacent to the lightening hole therein and an inclined support portion adjacent the other end thereof, said support portion being disposed at an angle with respect to said mounting portion so that said support portion lies substantially adjacent the associated flange, a platform connected to the outer end of said support portion and extending in use through the associated lightening hole for supporting an associated bundle thereon, whereby the associated flange is disposed between said platform and said support portion when said mounting portion is attached to one side of the bulkhead and the flange is disposed away from said support portion when said mounting portion is attached to the other side of the bulkhead, said platform having a passage therein for accommodating an associated binder tie therethrough, said passage serving to position the associated binder tie in the lightening hole with the plane of the lightening hole passing through the binder tie substantially parallel to the longitudinal axis thereof, whereby a binder tie disposed in the passage and secured around an associated bundle serves securely to position the bundle in the lightening hole for effectively retaining the bundle out of contact with the edge of the lightening hole.

2. The bracket set forth in claim 1, wherein said mounting portion of said leg is disposed in use substantially parallel to the associated bulkhead.

3. The bracket set forth in claim 1, wherein said platform is connected at one end thereof to said support portion of said leg.

4. The bracket set forth in claim 1, wherein the extent of said support portion of said leg in the direction of the flange is slightly greater than the extent of the associated flange.

5. A bracket for mounting and retaining wire bundles or the like through a lightening hole in a bulkhead by retaining a binder tie secured around the bundle wherein the bulkhead has a flange thereon extending around the periphery of the lightening hole and disposed at a predetermined angle with respect to the bulkhead, said bracket comprising a single leg having amounting portion for attachment adjacent to one end thereof to either side of the bulkhead adjacent to the lightening hole therein and an inclined support portion at the other end thereof, said mounting portion having a single opening therethrough to receive a single-associated fastener for attachment of said leg to the bulkhead adjacent to the lightening hole therein, said support portion being disposed at an angle with respect to said mounting portion essentially equal to the predetermined angle so that said support portion accommodates the associated flange, a platform connected to the outer end of said support portion and extending in use through the associated lightening hole for supporting an associated bundle thereon, whereby the flange can be disposed between said platform and said support portion when said mounting portion is attached to one side of the bulkhead and the flange is disposed away from said support portion when said mounting portion is attached to the other side of the bulkhead, the opposite sides of said platform respectively being disposed adjacent to the edge of the lightening hole for limiting pivotal movement of said platform about the longitudinal axis of the associated fastener, said platform having a passage therein for accommodating an associated binder tie therethrough, said passage serving to position the associated binder tie in the lightening hole with the axis of the binder tie disposed in a plane substantially parallel to the plane of the lightening hole, whereby a binder tie disposed in the passage and secured around an associated bundle serves securely to position the bundle on the bracket in the lightening hole for effectively retaining the bundle out of contact with the edge of the lightening hole.

6. A bracket for mounting said retaining wire bundles or the like through a lightening hole in a bulkhead by retaining a binder tie secured around the bundle, said bracket comprising a mounting leg for attachment to the associated bulkhead adjacent to the lightening hole therein, a platform connected to said leg and having a flat planar support surface extending in use into the associated lightening hole for mounting and retaining an associated bundle thereon, and a pair of substantially parallel retaining flanges respectively connected to the opposite side edges of said support surface along the entire length thereof and extending in use upwardly therefrom and axially of the associated lightening hole for guiding and retaining the associated bundle on said support surface, said platform having a passage extending therethrough beneath said support surface for enclosing and retaining an associated binder tie therein with the binder tie disposed in the lightening hole and around the associated bundle, whereby a binder tie disposed in the passage and secured around an associated bundle serves securely to position the bundle on said bracket in the lightening hole for effectively retaining the bundle out of contact with the edge of the lightening hole.

7. A bracket for mounting and retaining wire bundles or the like through a lightening hole in a bulkhead by retaining a binder tie secured around the bundle, said bracket comprising a single mounting leg having a single opening therethrough to receive a single associated fastener for attachment of said leg to the bulkhead adjacent to the lightening hole therein, a platform connected to said leg and extending in use through the associated lightening hole for supporting an associated bundle thereon, said platform having a width such that the opposite sides thereof are each disposed closely adjacent to the edge of the lightening hole for limiting pivotal movement of said platform about the longitudinal axis of the associated fastener, said platform having a passage therein for accommodating an associated binder tie therethrough, said passage serving to position the associated binder tie in the lightening hole with the plane of the lightening hole passing through the binder tie substantially parallel to the longitudinal axis thereof, whereby a binder tie disposed in the passage and secured around an associated bundle serves securely to position the bundle on the bracket in the lightening hole for effectively retaining the bundle out of contact with the edge of the lightening hole.

* * * * *

UNITED STATES PATENT OFFICE
CERTIFICATE OF CORRECTION

Patent No. 3,632,069          Dated January 4, 1972

Inventor(s) Arlie J. Thayer, Douglas H. Cameron

It is certified that error appears in the above-identified patent and that said Letters Patent are hereby corrected as shown below:

Column 1, line 21, "serve" should be --serves--;

Column 4, line 56, "HOwever" should be --However--;

line 64, "100A" should be --110A--;

Column 5, line 73, "210" should be --310--;

Column 6, lines 33-67 should not be in italics;

line 45, "he" should be --the--;

line 52, "325" (second occurrence) should be --324--;

line 65, "he" should be --the--;

Claim 5, line 20, "amounting" should be --a mounting--; and

Claim 6, line 52, "said" should be --and--.

Signed and sealed this 15th day of August 1972.

(SEAL)
Attest:

EDWARD M. FLETCHER, JR.      ROBERT GOTTSCHALK
Attesting Officer            Commissioner of Patents